Patented Oct. 12, 1937

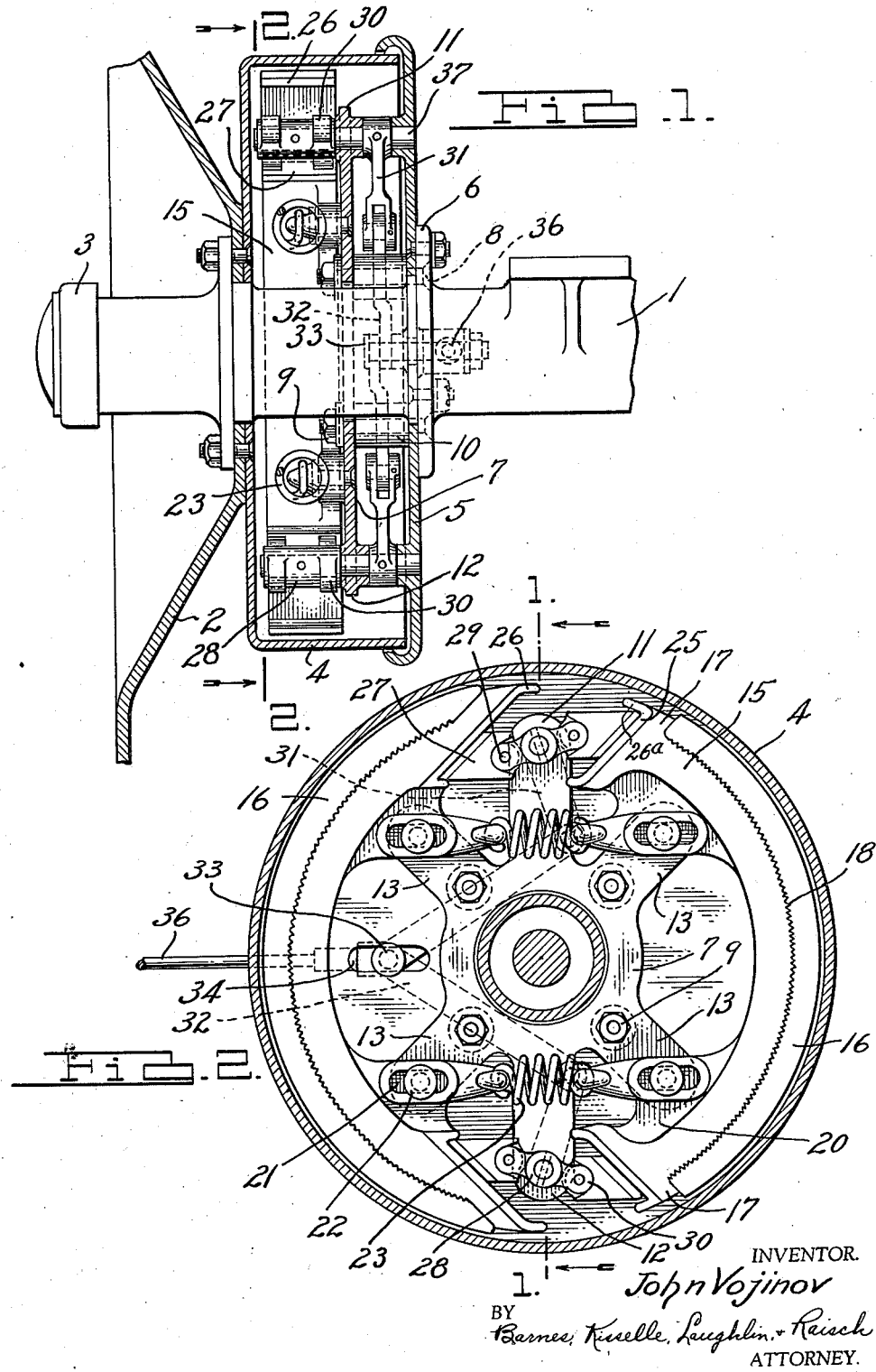

2,095,723

UNITED STATES PATENT OFFICE 2,095,723

BRAKE

John Vojinov, Dearborn, Mich.

Application May 11, 1936, Serial No. 79,025

11 Claims. (Cl. 188—78)

This invention relates to a brake and has to do particularly with a brake structure especially suited for use with automotive vehicles.

The invention aims to provide a brake of a simple rugged structure which will require a minimum of attention, and which will perform effectively over a long period of time without adjustment. Further, the invention aims to provide a brake structure which may be, and preferably is, of the internal expanding type wherein braking shoes are expanded outwardly into contact with the inner surface of a brake drum, and wherein a substantially uniform pressure is obtained throughout the circumferential extent of the brake shoes with the drum. Still further, the invention contemplates a structure so arranged and organized that when the brake linings are worn to the point where they should no longer be used and where there is a danger of scoring the brake drum by rivets or other metal parts, the movement of the parts in the braking action is limited or stopped, so that the brake must be relined at this time. This prevents continued use of the brake after it should have been repaired, and preserves the braking surface of the drum.

To some of these ends the brake shoes are mounted for movement bodily toward and away from the drum, particularly for the purpose of attaining the uniform pressure of the shoe with the brake drum. Means are provided for effecting this shoe movement which applies the motivating force to the shoe or shoes at spaced points, as for example, at their ends, so that each end of the shoe moves toward the braking drum a like distance.

In the accompanying drawing:

Fig. 1 is a cross sectional view taken through a brake structure designed in accordance with the invention taken substantially on line 1—1 of Fig. 2.

Fig. 2 is a sectional view taken transversely of the axis and substantially on line 2—2 of Fig. 1.

The brake structure shown in the drawing is applied to a driving axle such as the conventional rear axle, although it will be appreciated that is may be applied to an axle with dirigible wheels. The axle housing is indicated at 1 and the disc body portion of a wheel is illustrated at 2, held to the driving shaft by suitable means (not shown) within the hub cap 3. A brake drum 4 is secured to the wheel. A back plate 5 is secured to the axle housing, as for example, by a flange 6 on the housing. It will, of course, be understood that the brake drum rotates with the wheel and the back plate is stationary with the axle.

A supporting member which may be in the form of a spider is shown at 7 and which likewise is fixedly secured to the axle, as for example through the means of bolts 8 taken through the flange 6 and having nuts 9. The supporting member may be spaced from the back plate to accommodate certain operating elements, and spacers 10 may be used between the back plate and the support, through which the bolts 8 may pass.

Referring now to Fig. 2: The support, as shown, may be of spider form having projecting arms 11 and 12 for carrying certain operating mechanism and other arms 13, which in effect carry the shoes. The shoes are similar and are shown at 15, the same being of arcuate shape and extending throughout approximately half the circumference of the drum, save for the space required for the operating mechanism. Suitable friction material 16 is mounted upon the shoes. This material may be riveted to the shoes or may be merely laid upon the shoes and positioned by end abutments 17. The shoes may have a serrated surface 18 in this case for gripping the friction material.

Each shoe is mounted on two of the arms 13. For this purpose each shoe may have boss formations 20 formed with elongated slots 21, and the arms 13 may carry headed studs 22 which lie in the slots. These elongated slots preferably lie perpendicular to a diametrical line drawn through the rocking centers of the operating elements which are carried by the arms 11 and 12. Thus it will be observed that the shoes may be spread apart or moved toward each other, sliding on the studs 22. The shoes may be normally held retracted or toward each other by coil springs 23 hooked onto the boss formations 20, as shown.

The shoes are arranged to be expanded against the brake drum by the application of force to opposite ends thereof. For this purpose the ends of the shoes may be provided with an abutment of suitable material, as shown at 25, suitably attached to the shoes 15, and the abutments may each have overhanging lips 26 and 26a. The operating means takes the form of wedge members or blocks 27 for engaging the abutments 25. Mounted on the arms 11 and 12 are rocker pins 37, and these, as shown in Fig. 1, may be mounted at opposite ends in the support and the back plate. A cross arm 28 is mounted on each pin 37, and opposite ends thereof are operably engaged with the blocks 27. Preferably, the arms are secured to the blocks by fulcrum pins 29. Also, the ends of these arms are preferably rounded and seated in sockets in the blocks so that the ends of the arms are fulcrumed in the blocks as indicated at 30.

Operating arms 31 are secured to the pins 37, and these may lie between the support and the back plate. The arms 31 are joined pivotally to links 32 which may come together and pivotally connect with a stud 33 which extends through a slot 34 in the back plate 5 where it is connected to a pull rod or cable 36.

The operation is as follows: Normally the shoes are pulled toward each other away from the drum. The brake is released. To apply the brake the operating rod 36 is pulled which, through the links 32 and arms 31, rocks the pins 37 and the cross arms 28. The cross arm shown in the upper portion of Fig. 2 is caused to rock clockwise; the lower cross arm shown in Fig. 2 is caused to rock counter-clockwise. This action serves to spread the blocks 27. In this spreading action the blocks are moved bodily, one inwardly and one outwardly, with a sliding engagement on the abutments 25. It will be noted that the engaged surfaces of the abutments, and as well the engaging surface of the blocks, are disposed at a suitable angle, preferably about 45° to a diametrical line cutting through the pins 37 so that this action shifts the shoes bodily outwardly and ultimately into engagement with the drum. This applies the brake as the lining frictionally engages the drum. The shoes may shift outwardly due to the elongated slots 21 and studs 22. When pressure is released from the rod or cable 36, the springs 23 retract the shoes to release the brake.

The abutments 25 and shoes 27 are preferably composed of suitable metal for taking the sliding force and for minimizing the friction of the sliding action. When the brakes are applied it is preferred that pressure be relieved from the fulcrum pins 29, and this is accomplished by reason of the fact that the cross arms are pivoted in the sockets of the blocks. However, when the brake is released the pins 29 serve to positively restore the blocks to a released position and further serve to hold the blocks to a released position and further serve to hold the blocks. However, should there be any breakage in the parts which may serve to more or less release a block the same is held from outward displacement by the overhanging lips 26 and from inward displacement by the overhanging lips 26a.

Due to this bodily shift of the brake shoes each brake shoe is engaged with the drum, with a substantially uniform pressure throughout its circumferential extent. Moreover, the pressure of the two shoes is equalized; the expanding action against the end of one brake shoe is counteracted by a similar action on the end of an adjacent shoe. Furthermore, it will be observed that the slots 21 serve ultimately to limit the outward movement of the shoes. Now this is preferably arranged and coordinated with the lining or friction material, to the end that when the friction material is worn to a point where it should no longer be used the inner ends of the elongated slots abut against the studs 22, and thus the brake must be serviced by relining the shoes, and damage to the surface of the drum is prevented.

When the brake is applied the torque on the shoes is effectively resisted by the spaced studs 22 mounting each shoe. This relieves, to a large extent, the torque on the operating structure, including blocks 27, cross arm 28 and associated structure. As a result, the power required to apply the brake is minimized, since substantially the only power required is that necessary to force the shoes out into engagement with the drum. This likewise relieves the work to be accomplished by the operating mechanism.

The particular brake structure shown herein is arranged to be operated, as described, by mechanical means including the pull rod 36, links 32, etc. Obviously, so far as the brake structure, including the shoes and blocks 27, etc., is concerned, other means may be employed for transmitting the operating force thereto, as for example hydraulic means.

I claim:

1. A brake structure comprising, a drum, a pair of opposed brake shoes within the drum, means slidably mounting the shoes for movement inwardly and outwardly relative to the drum, means for normally holding the shoes inwardly away from the drum, operating means including a rocker element substantially between adjacent ends of the shoes, and a pair of blocks associated with each rocker element and pivotally connected thereto eccentrically of the axis of the rocker element so as to be spread apart thereby, each of said blocks having a sliding wedging engagement with the end of a shoe, whereby to shift the shoes outwardly into engagement with the drum.

2. A brake structure comprising, a drum, a pair of opposed brake shoes within the drum, means slidably mounting the shoes for movement toward and away from each other, means normally holding the shoes inwardly away from the drum, operating means including an operating element disposed substantially between opposed ends of the shoes, a rocking cross piece on each rocker element, a block pivotally associated with each end of the cross piece, each block having a wedging engagement with the end of a shoe, whereby operation of the rocker element causes the shoes to move outwardly away from each other into engagement with the drum.

3. A brake structure comprising, a brake drum, a pair of opposed shoes in the brake drum slidably mounted for movement bodily toward and away from each other to disengage and engage the drum respectively, spring means holding the shoes toward each other, opposite ends of the shoes being spaced apart and in opposed relation, an operating rock shaft positioned substantially between each pair of opposed ends of the shoes, a cross piece fixed to the rock shaft, a block member pivotally connected to each end of the cross piece, each block having a wedging engagement with the end of a shoe for shifting the shoes away from each other into engagement with the drum.

4. A brake structure comprising, a brake drum, a pair of opposed shoes in the brake drum slidably mounted for movement bodily toward and away from each other to disengage and engage the drum respectively, spring means holding the shoes toward each other, opposite ends of the shoes being spaced apart and in opposed relation, the ends of the shoes having engaging surfaces disposed at an angle to a radial line, an operating rock shaft disposed between each two opposed ends of the shoe, a cross piece fixed to each rock shaft, a block pivoted to each end of the cross piece and having a surface for engaging the end of a shoe for wedging the shoes away from each other into engagement with the drum upon the rocking of the rock shafts.

5. A brake structure comprising, a brake drum, a pair of opposed shoes in the brake drum slidably mounted for movement bodily toward and away from each other to disengage and engage the drum respectively, spring means holding the shoes toward each other, opposite ends of the shoes being spaced apart and in opposed relation, an operating rock shaft disposed between each pair of opposed ends of the shoe, the ends of the shoes having engaging surfaces disposed at an angle of substantially 45° to a radial line drawn through the two rock shafts, a cross piece secured to each rock shaft, a block having a surface to surface engagement with the end of each shoe and each block being pivotally connected to one end of a cross piece, whereby operation of the rock shaft spreads the blocks and causes them, by wedging action, to shift the shoes away from each other into contact with the drum.

6. In a brake structure of the internal expanding type having a drum, a pair of opposed shoes within the drum slidably mounted for movement toward and away from each other, the end of each shoe being disposed at an angle to a radial line and said ends of the shoes being opposed, operating means including a pair of blocks between opposing ends of the shoes, one for engaging the angular surface of one shoe and one for engaging the angular surface of the other shoe, means for spreading the blocks to cause the shoes to move away from each other to engage the brake drum, each shoe having an overhanging lip for confining the block in contact therewith.

7. In a brake structure, a drum, a pair of opposed brake shoes therein slidably mounted for movement toward and away from each other, and having their ends in opposed relation, an operating rock shaft journaled between each pair of opposed ends, a cross piece mounted on each rock shaft, a pair of blocks between each pair of opposed ends of the shoes for engagement each with the end of a shoe, a recess in each block for pivotally receiving the end of the cross piece, and a pivot pin connecting the end of each cross piece with a block and disposed substantially on the axial center of the recess in the block.

8. A brake structure comprising, a brake drum, a supporting member within the drum, means including elongated slots and studs therein slidably mounting the brake shoes on the supporting member for movement toward and away from each other, spring means for holding the brake shoes toward each other, the ends of the shoes being in opposed relation and having inclined wedge surfaces, a pair of operating rock shafts, one between each pair of opposed ends of the brake shoes, and wedge members operably associated with the rock shafts and having a wedging engagement with the ends of the shoes for forcing the shoes away from each other into engagement with the drum upon operation of the rock shafts.

9. A brake structure comprising, a brake drum, a supporting member within the drum, means including elongated slots and studs therein slidably mounting the brake shoes on the supporting member for movement toward and away from each other, spring means for holding the brake shoes toward each other, the ends of the shoes being in opposed relation and having inclined wedge surfaces, a pair of operating rock shafts, one between each pair of opposed ends of the brake shoes, and wedge members operably associated with the rock shafts and having a wedging engagement with the ends of the shoes for forcing the shoes away from each other into engagement with the drum upon operation of the rock shafts, said elongated slots serving to limit the outward movement of the brake shoes.

10. A brake structure comprising, a brake drum, a pair of opposed brake shoes therein, a fixedly mounted supporting spider within the drum, said spider having a pair of spaced arms for each shoe, a pin and slot connection between each of the two arms and a shoe, friction material on the shoe, spring means for holding the shoes toward each other, the ends of the shoes being disposed in opposed relation, a pair of controlling rock shafts journaled on other arms of the spider, one substantially between each pair of opposed ends of the shoes, and means moved by the rock shafts for engaging the ends of the shoes and for spreading them apart, whereby the shoes move bodily away from each other and into contact with the drum.

11. A brake structure comprising, a brake drum, a pair of opposed brake shoes therein, a fixedly mounted supporting spider within the drum, said spider having a pair of spaced arms for each shoe, a pin and slot connection between each of the two arms and a shoe, friction material on the shoe, spring means for holding the shoes toward each other, the ends of the shoes being disposed in opposed relation, a pair of controlling rock shafts journaled on other arms of the spider, one substantially between each pair of opposed ends of the shoes, and means moved by the rock shafts for engaging the ends of the shoes and for spreading them apart, whereby the shoes move bodily away from each other and into contact with the drum, the pin and slot connections being arranged to limit the outward movement of the shoes to an extent within the practical limit of the wear of the facing material.

JOHN VOJINOV.